June 7, 1960 Q. A. HANSEN 2,939,551
SELF-APPLYING ELECTROMAGNETICALLY RELEASABLE BRAKE
Filed Jan. 14, 1958 2 Sheets-Sheet 1
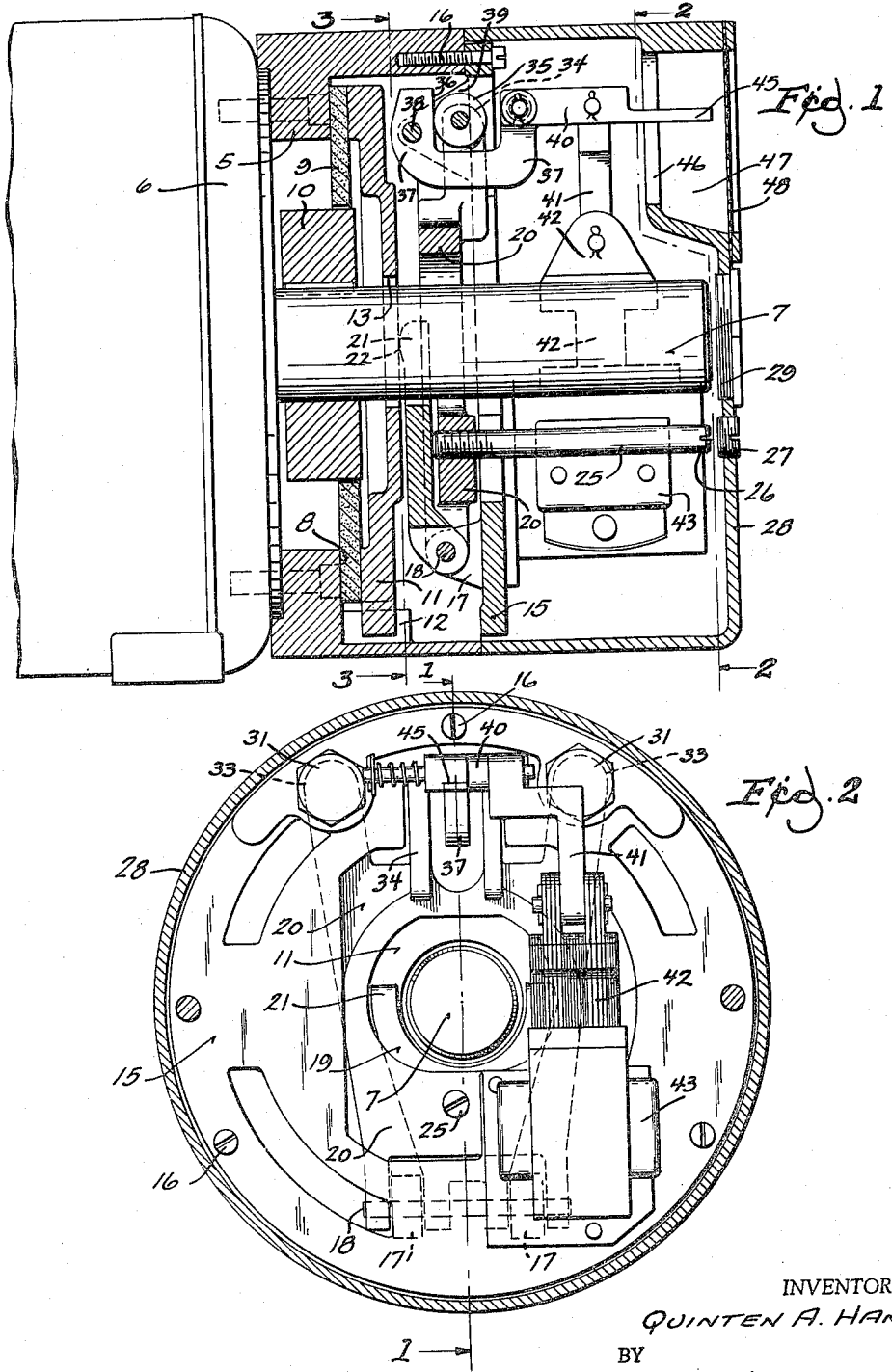
INVENTOR.
QUINTEN A. HANSEN
BY
Wheeler, Wheeler & Wheeler
ATTORNEYS June 7, 1960     Q. A. HANSEN     2,939,551
SELF-APPLYING ELECTROMAGNETICALLY RELEASABLE BRAKE
Filed Jan. 14, 1958     2 Sheets-Sheet 2
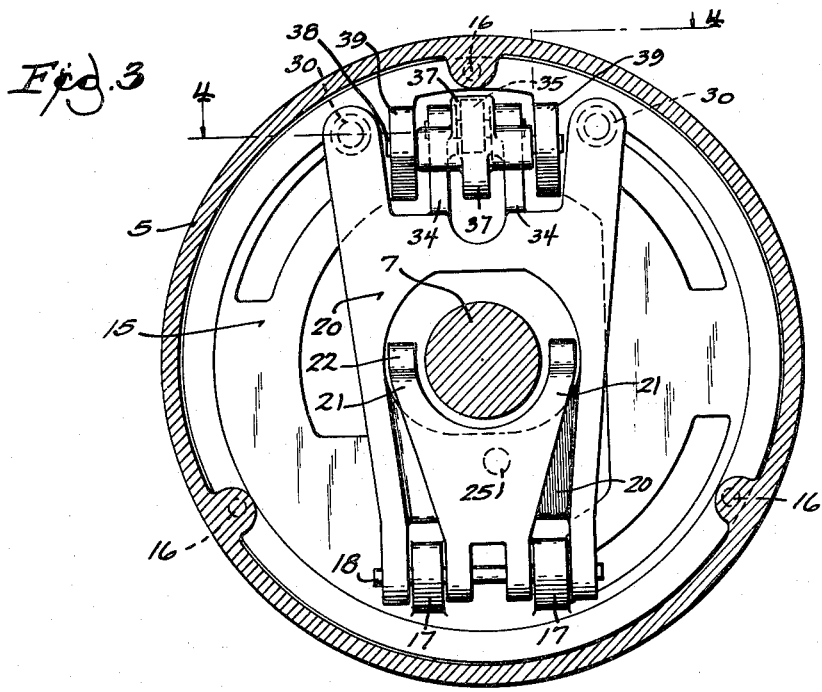
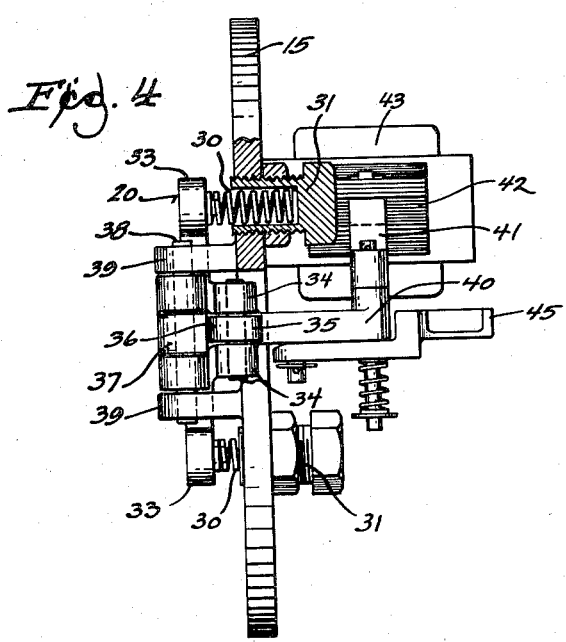
INVENTOR.
QUINTEN A. HANSEN
BY
Wheeler, Wheeler & Wheeler
ATTORNEYS though the shaft is so long that it cannot be accommodated within the housing 28, it may be extended through the housing by removing another removable plug provided at 29 for this purpose.

2,939,551
Patented June 7, 1960

2,939,551
SELF-APPLYING ELECTROMAGNETICALLY RELEASABLE BRAKE

Quinten A. Hansen, Racine, Wis., assignor to R. H. Stearns and R. N. Stearns, both of Milwaukee, Wis.

Filed Jan. 14, 1958, Ser. No. 708,830

7 Claims. (Cl. 188—171)

This invention relates to a self-applying electromagnetically releasable brake. The device herein disclosed is an improvement on the device shown in United States Patent 2,620,901 of December 9, 1952. Reference is also made to companion application of Luedtke and Wrensch, Serial No. 697,719 filed November 20, 1957.

The present invention provides a construction accommodating extension of the shaft of the motor to which the brake is applied. It is applicable even to shafts of such elongation that they project beyond the brake housing. To this end, a yoke type of lever is used, providing a central opening through which the shaft projects, and the lever has pressure applying springs which are applicable to its free end rather than to the central portion of the lever. Moreover, these springs are made adjustable whereby the braking action can be controlled with great accuracy. The solenoid and armature are offset at one side of the extended shaft.

A particular feature of the present invention consists of a novel arrangement for adjusting the parts to accommodate wear in the brake discs. Pressure is preferably applied to the outermost brake disc at points diametrically offset from the extended shaft of the motor and, to accommodate wear, the pressure applying means comprises a lever other than that upon which the springs act, there being a single, easily adjustable setscrew accessible from the exterior of the housing for adjusting the angle between the two levers.

In the drawings:

Fig. 1 is a view taken in section axially of the section in the plane indicated at 1—1 in Fig. 2.

Fig. 2 is a view in transverse section taken in the plane indicated at 2—2 in Fig. 1.

Fig. 3 is a view taken in transverse section on the line 3—3 of Fig. 1.

Fig. 4 is a view partially in plan and partially in section showing the mounting ring and clutch parts as viewed from the line indicated at 4—4 in Fig. 3.

In general, the brake itself is conventional in its organization and mounting. A ring 5 fastened to the motor shell 6 at the end from which the armature shaft 7 projects is counterbored to provide a brake face at 8 engaged by the brake disc 9 on the shaft. In accordance with the usual practice, a block 10 of non-circular contour (square, in practice) is keyed to the shaft 7, and the disc 9 has a corresponding non-circular opening which receives the block to be constrained for rotation with the shaft, while permitted axial movement for the performance of its braking function.

Engaged with the outer face of the disc 9 is the pressure plate 11. As shown in Patent 2,620,901, this plate has notched peripheral portions in splined sliding engagement with flanges 12 formed in the interior of the mounting ring 5. Unlike the pressure plate shown at 27 in the patent above identified, the pressure plate 11 in the present device has a central opening at 13 through which shaft 7 of the motor projects.

The brake applying pressure is applied through plate 11 to clamp the disc 9 between the friction surfaces at the periphery of the pressure plate 11 and those provided by the shoulder 8 of the mounting ring 5. In the instant device, the parts are normally subject to braking pressure through means hereinafter to be described, and the pressure is relieved by a solenoid which is so connected as to be energized concurrently with the energization of the motor.

All of the operating parts are mounted by a skeletonized disc 15 as best shown in Figs. 3 and 4. This disc is held by screws 16 to the ring 5 which is attached to the motor shell. At the bottom of the disc there are ears 17 (Fig. 3) which support a pintle 18 on which the complementary ears of levers 19 and 20 are pivoted. Lever 19 is forked and its laterally spaced ends 21 have bearing bosses 22 engaged with the brake pressure plate 11 as clearly shown in Figs. 1 and 3. Engagement between the thrust bosses 22 and the pressure plate 11 of the brake is desirably effected at points substantially on the transverse diameter of the armature shaft with which the pressure plate 11 of the brake is ordinarily concentric.

For transmitting brake applying pressure from lever 20 to lever 19, a setscrew 25 is threaded into the lever 20 and bears against lever 19 as best shown in Fig. 1. For manual operation, the setscrew is quite elongated, having its notched end 26 adjacent a removable plug 27 in the housing member 28 which encloses the brake parts and is connected with the mounting ring 5. In case the armature shaft is so long that it cannot be accommodated within the housing 28, it may be extended through the housing by removing another removable plug provided at 29 for this purpose.

Brake applying pressure is developed by compression springs 30 seated in sockets in screws 31 which are adjustably threaded in the ring 15. Extremely delicate adjustments of braking pressure are possible, in order that the armature shaft may be brought to rest within any desired period following de-energization of the motor. At their free ends, the springs bear against the arms 33 which are laterally spaced at the upper end of lever 20 as clearly shown in Fig. 3.

The lever has another pair of laterally spaced arms at 34 which support a cam follower roller 35 (Figs. 1 and 4) engaged by the surface 36 of a cam lever 37 pivoted by pintle 38 on the ears 39 which are mounted on ring 15 to project rearwardly therefrom between the outer ears 33 and the inner ears 34 of lever 20.

The lever 37 has an arm 40 connected by link 41 with the armature 42 of a solenoid whose coil 43 has electrical connections (not shown) to be energized concurrently with the motor whose armature shaft 7 is to be controlled.

Operation is as follows: When the solenoid is de-energized, the springs act (with a pressure determined by their adjustment) upon the arms 33 at the free upper end of lever 20 in a direction to oscillate the lever about pintle 18 toward the motor. Motion is communicated from the lever through the setscrew 25 to the intermediate lever 19 whose bearing bosses 22 are engaged with the pressure plate 11 on the brake. It will, of course, be understood that the brake design may incorporate as many intermediate plates as may be desired. The resulting friction between the plate or plates 9 mounted on the armature shaft and the plate or plates 8, 11 fixed against rotation will hold the armature shaft stationary, if it is at rest, or will arrest it more or less suddenly (depending on the spring adjustment) if the armature shaft is in motion at the time the brake is applied.

When the coil 43 is energized to attract armature 42, the lever system 40, 37 is oscillated around the pintle 38 to cause a camming movement of surface 36 respecting the cam follower roller 35 at the upper end of lever 20. This oscillates the lever against the compression of springs 30 to release the pressure through the inner lever 19 upon the pressure plate 11 of the brake. The armature shaft is then free for rotation.

The brake may be released manually by manipulation of lever 40. For this purpose, the finger 45 at the end of lever 40 projects through a slot 46 in housing 28 into a cavity 47 which is covered by a removable closure 48.

As wear occurs between the various brake elements, the levers 19 and 20 will have to oscillate somewhat beyond the normal upright position in which they are illustrated in Fig. 1. This, in turn, will permit the lever system 37, 40 to oscillate counterclockwise so that the finger 45 will no longer project horizontally. When the finger rises in slot 46, it is a signal to the operator that the screw 25 should be adjusted to compensate for wear. The correct adjustment is achieved when the screw is rotated sufficiently to restore lever 20 to its normal upright position, at which time lever 40 and finger 45 will be approximately horizontal as shown in Fig. 1. Lever 40 and finger 45 are, of course, moved downwardly from their horizontal position when the brake is released by solenoid energization, and they move upwardly only when wear occurs. The closure 48 will normally comprise a transparent membrane through which the position of finger 45 will be apparent at all times.

I claim:

1. A brake applicable to a motor having a motor shell and an extended armature shaft, the brake comprising a brake element mounted on the shaft, a plurality of relatively non-rotatable brake elements between which the brake element on the shaft is engaged, a first lever having a pivotal mounting offset from said shaft and having free end portions laterally offset at opposite sides of the shaft, and provided with thrust transmitting means engaged with one of the relatively non-rotatable brake elements for the delivery of friction-developing pressure to the several brake elements, a second lever having a pivotal mounting proximate to that of the first lever, and having an opening through which the extended armature shaft of the motor may extend, spring means acting on the second lever at the side of the shaft opening opposite the pivotal mounting of the second lever, and in a direction to effect frictional engagement of the brake elements through the first lever, a setscrew in threaded engagement with the second lever and engaged with the first lever for transmitting spring thrust from the first lever to the second lever for brake engagement, and means for effecting brake releasing movement of the second lever in opposition to the spring means.

2. The device of claim 1 in which the spring means has adjustable seat means for the predetermination of spring bias on the second lever.

3. The device of claim 1 in which the spring means comprises a pair of laterally offset springs for which the second lever has separate fingers providing spring seats, said springs having relatively fixed seats supporting the springs in positions to bias the second lever toward the brake elements.

4. A brake applicable to a motor shell from which an armature shaft projects, said brake including a mounting ring, a relatively non-rotatable brake element mounted on the mounting ring, a complementary relatively rotatable brake element for mounting on the shaft, a supporting ring detachably connected with the mounting ring, and means mounted on the supporting ring for actuating the first mentioned brake element into pressure engagement with the relatively rotatable brake element, the said means comprising a pair of levers both having pivotal connection with the supporting ring, a thrust element in threadedly adjustable connection with one of said levers and engaged with the other, the first lever being in thrust transmitting engagement with the brake element nonrotatably carried by the mounting ring, spring means provided with a seat on the supporting ring and engaged with the second of said levers for effecting movement of said first lever in a brake applying direction, and electromagnetic means carried by said supporting ring and having actuating connection with the second of said levers for the operation thereof in a direction to oppose said spring means.

5. The device of claim 4 in which a single pintle has the first lever and the second lever pivotally mounted upon it from the supporting ring, the first lever and the second lever both having centrally open areas for accommodating an extended motor shaft, the spring means comprising a plurality of springs laterally offset from each other and at the side of said openings opposite said pintle, the electromagnetic means comprising a solenoid and armature, the solenoid having means carrying it from the supporting means, and the armature having motion transmitting connections with the second lever which include a cam lever and a cam follower roller mounted on the second lever, the armature and solenoid being mounted in a position laterally offset from alignment with the centrally relieved portions of said levers.

6. In a brake for a motor armature shaft the combination with an armature-mounted rotatable brake element and a relatively nonrotatable element movable axially to and from frictional engagement with the rotatable element, of pressure-applying means applicable to the nonrotatable element and comprising a plurality of levers having pivots from which the levers extend in approximate parallelism and overlapping relationship, said levers being pivotally movable with respect to each other, a first of said levers being provided with actuating means and a second of said levers having a portion in thrust engagement with the nonrotatable brake element, which portion physically intervenes between said first lever and the relatively nonrotatable brake element, a thrust screw threadedly adjustable in one of said levers, the other lever being abutted by said screw, whereby thrust is transmitted from said first lever to the second lever and thence to the nonrotatable brake element, said screw being free of fixed connection with the lever abutted thereby, whereby to accommodate some deviation from parallelism between said levers.

7. The device of claim 6 in which the pivots of the respective levers are proximate and at the same side of the armature shaft, both of said levers extending from their respective pivots toward said shaft and at least as far as the axis thereof.

References Cited in the file of this patent

UNITED STATES PATENTS

| 2,059,244 | Kiekhaefer | Nov. 3, 1936 |
| 2,163,039 | Hinricher | June 20, 1939 |
| 2,620,901 | Stearns | Dec. 9, 1952 |

FOREIGN PATENTS

| 757,522 | Great Britain | Sept. 19, 1956 |